June 2, 1942. R. D. PIKE 2,285,124
VACUUM CHURN
Filed Nov. 14, 1938
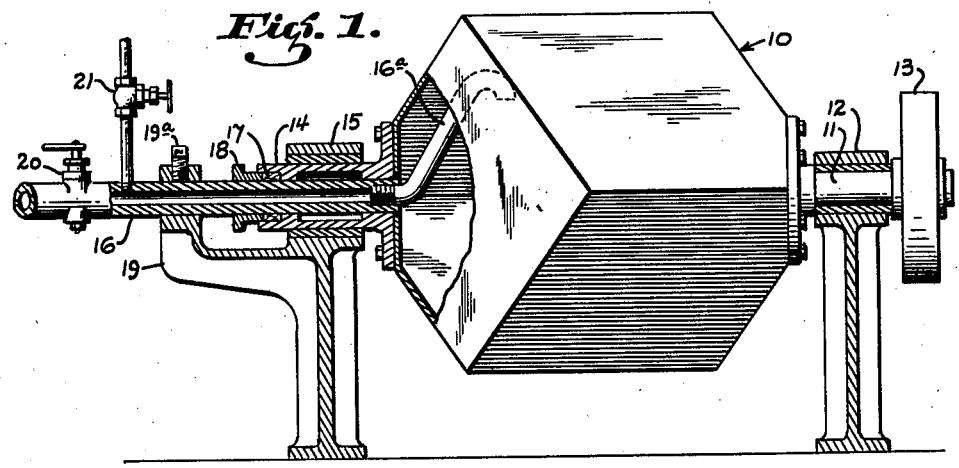
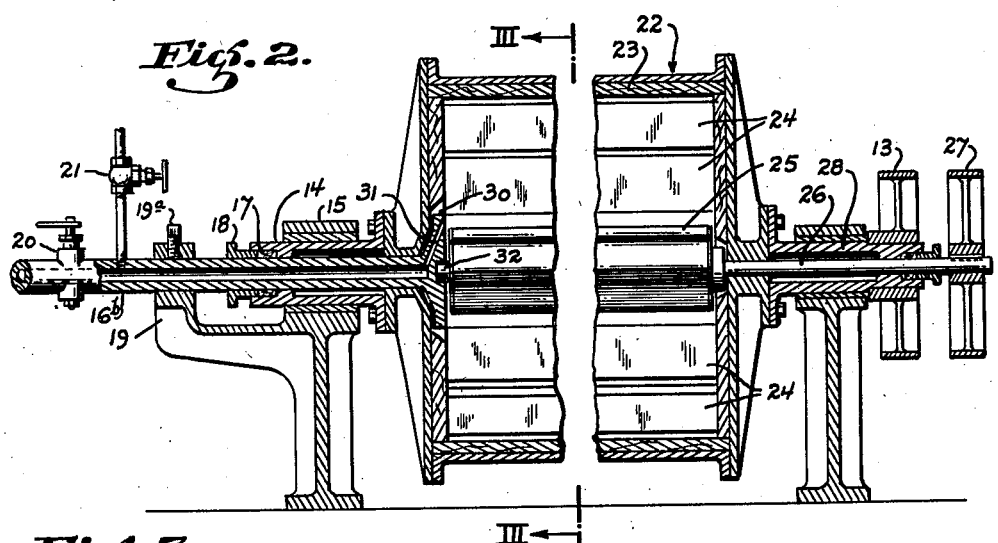
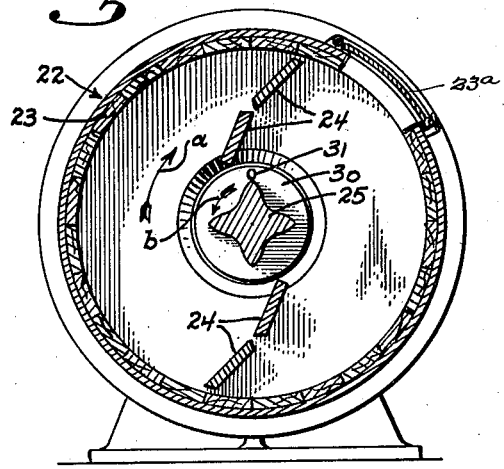
INVENTOR.
Robert D. Pike.
BY
Chas. E. Townsend.
ATTORNEY.

Patented June 2, 1942

2,285,124

UNITED STATES PATENT OFFICE 2,285,124

VACUUM CHURN

Robert D. Pike, Piedmont, Calif., assignor to A. W. Stitt, San Francisco, Calif.

Application November 14, 1938, Serial No. 240,291

3 Claims. (Cl. 31—34)

The present invention relates to vacuum churns and particularly to means for creating a partial vacuum within a churn while it is operating and during the process of making butter or the like. The invention is particularly applicable to churns of the cubical type, but may also be applied to a cylindrical type of churn having internal workers which revolve with the churn, and will be shown and described herein in its application to both these types.

It is the object of the invention to provide simple and effective means for producing low pressure or partial vacuum within a churn, and for varying the pressure within the churn at will during the churning operation and without drawing out any of the liquid or solid matter that is being churned.

Further objects and advantages of the invention will be made apparent in the following specification, wherein reference is made to the accompanying drawing:

Fig. 1 is a front elevation with parts shown in section of a cubical churn embodying the present invention.

Fig. 2 is a vertical longitudinal section of a cylindrical churn of the type carrying workers which revolve with the cylinder and interior thereof, and illustrates the manner in which the invention is applied to this type of churn, and Fig. 3 is a transverse section taken on the line III—III of Fig. 2.

Referring first to Fig. 1 of the drawing, a cubical churn is illustrated at 10. This churn 10, as is common practice, is supported for rotation on an axis which passes through two of its oppositely-disposed corners, which corners are cut short for the application of bearing flanges thereto, in the manner illustrated in the drawing. A drive shaft 11 is secured by one of said flanges to one corner of the churn 10 and is rotatably supported in a bearing 12, so that power may be applied from a source, not shown, through the medium of a drive pulley 13 affixed to the shaft to impart rotation to the churn. At its opposite end the churn 10 is provided with a hollow shaft 14 rotatably supported in a suitable bearing 15. A pipe 16 which is normally secured against rotation extends through the hollow bearing 15 concentrically therewith to communicate with the interior of the churn, and preferably a stuffing box 17 is provided with a gland 18 for preventing leakage between the interior surface of the rotating bearing 14 and the exterior surface of the non-rotatable pipe 16. The pipe 16 is supported and maintained in alignment by a bracket indicated at 19 and a set screw 19ª extends through the bracket and engages the pipe 16 normally to prevent rotation thereof, but to permit slight adjustment of the position of the pipe when desired for purposes hereinafter to be set forth in detail. The pipe 16 communicates with a vacuum pump, not shown, and a valve 20 in this pipe controls communication between the vacuum pump and the interior of the churn. A vent pipe is preferably tapped into the pipe 16 intermediate the valve 20 and the churn and is controlled by a valve 21 which serves to admit atmospheric pressure to the interior of the churn when desired.

At the inner end of the pipe 16 which communicates with the interior of the churn a fitting 16ª is provided to extend inwardly and upwardly of the churn in a position where it will be free from interference by the walls of the churn as it rotates, and in a position such that its upper end will be well above the level of any liquid matter in the churn; the upper end of the fitting 16ª may also be curved to point downwardly, thus to prevent any possibility of liquid which is splattered within the churn from entering the fitting and passing through the vacuum pipe 16.

In operation the churn is partially filled with cream through an air-tight door 23ª, shown in Fig. 3, and while the churn is at rest it is apparent that the cream level will be horizontal and below the inlet end of the fitting 16ª which leads to the vacuum pipe. As the churn is rotated, however, there is a tendency for the liquid level therein to vary from the horizontal and to assume an angle which is determined by the direction and speed of rotation of the churn. It is therefore desirable, in order that the inlet end of the fitting 16ª be as far as possible from the liquid contents of the churn, that this fitting be adjustable to an angle which varies from the vertical position. To obtain this adjustment, the set screw 19ª may be loosened and the pipe 16 turned till the fitting assumes the proper angle and the fitting may be secured in this position by again tightening the set screw. As the churn is put into operation, the vacuum is increased until it reaches the desired maximum, at which time the valve 20 may be closed, and when the churning operation is completed the vacuum may be released by opening the vent valve 21, thus making it possible to open the door of the churn and remove the contents therefrom.

Referring to the form of the invention illustrated in Fig. 2, the body of the churn is shown as a cylindrical metallic casing, generally indicated at 22, which is provided with a lining wall 23. In this churn worker shelves 24, the positions of which are best illustrated in Fig. 3, extend between the ends of the churn and rotate therewith, while a worker 25 is supported for rotation concentrically of the churn and in a direction opposite thereto. The worker 25 is driven by a shaft 26 and pulley 27, the shaft 26 being concentric to the shaft 28, which in this form of the invention corresponds to the shaft 11 illustrated in Fig. 1. At its opposite end the cylindrical churn is supported in the same manner as the cubical churn shown in Fig. 1 and the vacuum pipe 16$^b$ is identical in construction and in function to the churn in Fig. 1, with the exception that at its inner end the fitting 16$^a$ is eliminated because of the fact that it would interfere with the movements of the worker shelves 24 and worker 25. Instead of the fitting 16$^a$ the inner end of the pipe 16$^b$ in Fig. 2 is provided with a disk 30 which is recessed into the end wall of the churn and which has a port 31 extending therethrough at an angle to form a communication between the interior of the churn and the interior of the pipe 16$^b$. The disk 30 is also provided with a central recess which receives and forms a bearing for a journal 32 projecting from the end of the worker 25.

In the operation of this latter form of the invention, the churn and worker shelves rotate in the direction of the arrow $a$ in Fig. 3, while the worker 25 rotates in the direction of arrow $b$. The result of this operation is to cause the liquid and semi-solids within the churn to gather more at one side than at the other, and consequently by rotational adjustment of the pipe 16$^b$ as permitted by loosening and tightening the set screw 19$^a$ the end of the port 31 which communicates with the interior of the churn and which is shown at its highest position in Fig. 3, may be regulated as to position so as to reduce to a minimum any possibility of matter entering the vacuum pipe 16$^b$. By forming the disk 30 of relatively flat shape and positioning the end of the worker 25 as closely thereto as possible, the adjustable port 31 is available with little or no loss of working efficiency within the churn.

While certain features of the invention are set forth more or less specifically herein, it should be understood that the foregoing description is illustrative only and that the invention is limited only by the scope of the appended claims.

Having thus described my invention, what I claim and desire to secure by Letters Patent is:

1. The combination with a rotatable churn of means for effecting a partial vacuum therein during rotation, comprising a vacuum conduit extending into the churn concentric with its axis of rotation, a continuation of said conduit extending to a point above the normal liquid level in the churn, and means for supporting said conduit and permitting adjustment of the angle of the continued portion of said conduit to position its open end in an area free from liquid during rotation of the churn.

2. In a churn of the character described means for effecting partial vacuum during churning, which comprises a hollow shaft supporting the churn for rotation, a vacuum conduit extending through said shaft and into the churn, a fitting on the inner end of said conduit extending upwardly inside the churn, means supporting and permitting adjustment of the conduit to vary the position of said fitting, and means to secure it in its adjusted position.

3. In a churn of the character described, means for effecting partial vacuum during churning which comprises a hollow shaft supporting the churn for rotation, a vacuum conduit extending through said shaft and into the churn and having an opening communicating with the interior of the churn at a point eccentric to the shaft, and means supporting said conduit and permitting rotation of the conduit whereby the position of said opening may be adjusted to a desired level within the churn.

ROBERT D. PIKE.